(12) United States Patent
Frenger et al.

(10) Patent No.: US 9,161,373 B2
(45) Date of Patent: *Oct. 13, 2015

(54) METHODS AND ARRANGEMENTS FOR CONTENTION RESOLUTION IN A COMMUNICATION SYSTEM

(75) Inventors: Pål Frenger, Linköping (SE); Erik Eriksson, Linköping (SE); Fredrik Gunnarsson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 86 days.

This patent is subject to a terminal disclaimer.

(21) Appl. No.: 13/820,668

(22) PCT Filed: Sep. 22, 2010

(86) PCT No.: PCT/SE2010/000229
§ 371 (c)(1),
(2), (4) Date: Mar. 4, 2013

(87) PCT Pub. No.: WO2012/039651
PCT Pub. Date: Mar. 29, 2012

(65) Prior Publication Data
US 2013/0170385 A1    Jul. 4, 2013

(51) Int. Cl.
*H04W 74/08* (2009.01)
*H04W 48/20* (2009.01)
(Continued)

(52) U.S. Cl.
CPC ............ *H04W 74/085* (2013.01); *H04W 48/20* (2013.01); *H04L 5/0023* (2013.01); *H04L 5/0091* (2013.01); *H04W 48/12* (2013.01); *H04W 72/005* (2013.01); *H04W 74/006* (2013.01)

(58) Field of Classification Search
CPC ............... H04W 28/0205; H04W 72/1226; H04W 72/12; H04W 48/00; H04W 72/1294; H04W 28/14; H04W 74/00; H04W 48/20; H04W 48/12; H04W 72/005; H04W 72/0042; H04W 74/085; H04W 74/006; H04W 74/0891; H04L 5/0023; H04L 5/0091
USPC .......... 370/252, 329–333, 312, 436; 455/507–509, 450, 411, 435.3, 438, 455/452.1
See application file for complete search history.

(56) References Cited

U.S. PATENT DOCUMENTS
8,599,733 B2 * 12/2013 Rysgaard .................... 370/312
2005/0163080 A1 * 7/2005 Suh et al. .................... 370/331
(Continued)

FOREIGN PATENT DOCUMENTS
EP         2395787 A1    12/2011
JP       2010028545 A     2/2010
(Continued)

OTHER PUBLICATIONS
Ericsson, "Downlink Coordinated Transmission—Impact on Specification", TSG-RAN WG1 #55, Nov. 10, 2008, pp. 1-3, R1-084377, 3rd Generation Partnership Project, Prague, Czech Republic.
(Continued)

*Primary Examiner* — Charles C Jiang
*Assistant Examiner* — Mohamed Kamara
(74) *Attorney, Agent, or Firm* — Coats & Bennett, PLLC

(57) ABSTRACT

The present invention relates a User Equipment, UE (204) and a Radio Base Station (202, 206) and methods therein for contention resolution in general. Based on measured and analyzed measurements of a radio connection establishment response from each of at least a first and a second Radio Base Station, a UE receiving said radio connection establishment response can resolve the contention by selecting a RBS based on the received power of a set of DL reference signals as received by the UE, of the received power of the radio connection establishment responses, on timing of the received sets of reference signals, on timing of the radio connection establishment responses, on historic RBS selections, on priority level of the RBS, to mention a few alternatives.

23 Claims, 4 Drawing Sheets

(51) Int. Cl.
*H04L 5/00* (2006.01)
*H04W 48/12* (2009.01)
*H04W 72/00* (2009.01)
*H04W 74/00* (2009.01)

(56) References Cited

U.S. PATENT DOCUMENTS

| | | | |
|---|---|---|---|
| 2006/0187869 A1* | 8/2006 | Czaja et al. | 370/320 |
| 2007/0015510 A1* | 1/2007 | Xiang | 455/436 |
| 2007/0167180 A1 | 7/2007 | Ramesh et al. | |
| 2009/0011767 A1* | 1/2009 | Malladi et al. | 455/450 |
| 2009/0135769 A1* | 5/2009 | Sambhwani et al. | 370/329 |
| 2009/0185543 A1 | 7/2009 | Chen et al. | |
| 2010/0080154 A1 | 4/2010 | Noh et al. | |
| 2010/0323709 A1* | 12/2010 | Nam et al. | 455/450 |
| 2011/0164593 A1* | 7/2011 | Huet et al. | 370/333 |
| 2012/0002537 A1* | 1/2012 | Bao et al. | 370/221 |
| 2012/0009899 A1* | 1/2012 | Karaoguz et al. | 455/411 |
| 2012/0051445 A1* | 3/2012 | Frank et al. | 375/259 |
| 2014/0092842 A1* | 4/2014 | Ahn et al. | 370/329 |
| 2014/0247767 A1* | 9/2014 | Chen et al. | 370/312 |

FOREIGN PATENT DOCUMENTS

| | | | |
|---|---|---|---|
| WO | 9904593 A1 | 1/1999 | |
| WO | 0056103 A1 | 9/2000 | |
| WO | 0207459 A2 | 1/2002 | |
| WO | 02069525 A1 | 9/2002 | |
| WO | 03077457 A1 | 9/2003 | |
| WO | 2008024788 A2 | 2/2008 | |
| WO | 2009041878 A1 | 4/2009 | |
| WO | 2010002303 A1 | 1/2010 | |
| WO | 2010075701 A1 | 7/2010 | |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Technical Specification, 3GPP TS 36.300 V10.0.0, Jun. 1, 2010. pp. 1-183. 3GPP, Sophia-Antipolis, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Technical Specification, 3GPP TS 36.300 V10.0.0, Jun. 1, 2010, pp. 1-8, 3GPP, [Retrieved on Feb. 28, 2013], Retrieved from Internet: http://www.quintillion.co.jp/3GPP/Specs/36300-a00.pdf.

Ericsson, "Downlink coordinated transmission—Impact on specification", TSG-RAN WG1 #55, R1-084377, Nov. 10, 2008, pp. 1-2, Prague, Czech Republic.

3rd Generation Partnership Project, "3rd Generation Partnership Project; Technical Specification Group Radio Access Network; Evolved Universal Terrestrial Radio Access (E-UTRA) Medium Access Control (MAC) protocol specification (Release 8)", Technical Specification, 3GPP TS 36.321 V8.8.0, Dec. 1, 2009, pp. 1-47, 3GPP, France.

ZTE, "On DL Component Carrier Ambiguity in Initial Random Access Procedure", 3GPP TSG RAN WG1 Meeting #57, San Francisco, USA, May 4, 2009, R1-091700, pp. 1-8, 3GPPP.

* cited by examiner

METHODS AND ARRANGEMENTS FOR CONTENTION RESOLUTION IN A COMMUNICATION SYSTEM

TECHNICAL FIELD

This invention pertains in general to the field of contention resolution, and more particularly related to the field of contention resolution in a communication system.

BACKGROUND

A cell in a radio communication system is traditionally defined as the coverage area of the system broadcast channel. In most 3rd Generation Partnership Project (3GPP) radio communication systems, such as Global System for Mobile communication (GSM), High Speed Packet Access (HSPA), and Long Term Evolution (LTE), the coverage area of the data channels is identical to the coverage area of the broadcast channel. However, as the performance of current systems is improved with novel features supporting Coordinated Multi-Point transmission and reception (CoMP), multi-carrier, and multi-hop, the coupling between system information coverage and data coverage becomes increasingly unmotivated. As will be described below there are several problems associated with this coupling.

Support for Self Optimizing Networks is Limited

If we want to automatically optimize system parameters that affect the coverage, e.g. antenna tilt, antenna beam-width, antenna pointing direction, base station transmission power, etc. then we will always risk that coverage is lost in some locations in the network. The only way we can observe this coverage loss is if customers call in and report to their operator that their service no longer works. The operators typically do not accept this and therefore, antenna and power parameters are planned when the system is deployed and are then left unchanged. The fear of breaking something that works is a show-stopper for many automatic network optimization algorithms. As a consequence most systems operate with sub-optimal settings, which is a problem.

Energy is Wasted in the Network

Now with the introduction of LTE Release-10, we have designed a system capable of achieving 1 Gbps data throughput. Future LTE releases are expected to provide even higher bitrates and even better system capacity. While there is a commercial drive for higher data transmission rates and higher capacity, there is no need at all to transmit more system information because of that. When we need to increase the capacity in an area then we need to add more cells and as a result the system information channels become over-dimensioned. If an area already has sufficient coverage for system information channels then there is no need for the new cells in that area to transmit any system information at all. In current systems, where every antenna and every carrier in the network has to be observable all the time, most of the energy consumed in the network is spent transmitting system overhead.

Support for Advanced Antenna Techniques Becomes Limited

Traditional beam-forming, where the antenna radiation pattern is adjusted towards a single UE, does not work if that implies that the coverage area of the broadcast channel is affected. In LTE Rel-8 user specific beam-forming is supported to some extent by means of using different pre-coding weights for data and broadcast signals. However we can not adjust the individual antenna elements such that energy is concentrated towards where a user is located since that would also affect the coverage of the broadcast channel.

High Interference Also During Low Load Limits Performance

Since each cell need to continuously transmit system information and mobility measurement signals (i.e. the primary common pilot channel, P-CPICH, in WCDMA and cell specific reference symbols, CRS, in LTE) we will always have a minimum amount of interference in the system. This non-traffic data related source of interference, sometimes known as pilot pollution, significantly limit the system performance during times of low traffic. Without pilot pollution the peak rates, especially during low traffic hours, would be significantly increased.

When there is little or no relation between the coverage of a Broadcast Channel Area, which can be defined as the coverage area of the system broadcast channel and the coverage area that can be provided by a single network node then problems with basic system functions such random access responses can occur.

Depending on whether the nodes in the BCH Area can communicate with each other quickly enough or not, the mobile station may receive several random access responses from several nodes in the BCH Area. If this happens there is a risk that the random access responses collide with the effect that the User Equipment will not be able to decode any of the random access response messages, and that can cause the whole system attach procedure to fail.

There is thus a need to overcome the prior art disadvantages.

SUMMARY

According to one aspect of the present invention, a method in a first Radio Base Station, RBS for communicating radio connection establishment information using Orthogonal Frequency Division Multiplexing (OFDM) to a plurality of User Equipments, (UEs) is provided. The method comprises broadcasting system information that is related to establishing a radio connection on a Broadcast Channel, BCH using a Multicast Broadcast Single Frequency Network (MBSFN) radio transmission format, to said plurality of UEs. The broadcasting is performed synchronously in time with broadcasting the same system information on BCH using MBSFN radio transmission format by at least a second RBS. The method comprises receiving a radio connection establishment request from the UE, wherein the radio connection establishment request is related to the broadcasted system information. The method also comprises determining a set of Downlink (DL) demodulation reference signals that are associated with a DL control channel, based on the radio connection establishment request. The method also comprises transmitting to the UE a radio connection establishment response comprising the set of DL demodulation reference signals associated with a control channel.

According to one aspect of the present invention, a method in a User Equipment (UE) for contention resolution of radio connection establishment responses from a plurality of Radio Base Stations (RBSs), is provided. The method comprises receiving broadcast system information on a Broadcast Channel (BCH) from the plurality of RBSs. The method also comprises transmitting a radio connection establishment request to the plurality of RBSs, in relation to the received broadcasted system information. The method further comprises receiving a radio connection establishment response from each of at least a first RBS and a second RBS, each of said radio connection establishment response comprising a set of DL demodulation reference signals associated with a control channel. In addition, the method comprises performing measurements of the received radio connection establishment responses, thereby obtaining measurement results, and selecting the first RBS responsible for communication with the UE based on the obtained measurement results.

The system information in the step of broadcasting system information may comprise Random Access Channel, RACH information.

The radio connection establishment request in the step of receiving a radio connection establishment request, may comprise a Random Access preamble related to the broadcasted system information.

The radio connection establishment request in the step of receiving a radio connection establishment request, may comprise a Random Access Radio Network Temporary Identifier, RA-RNTI related to the broadcasted system information.

The step of determining a set of Downlink, DL demodulation reference signals associated with a DL control channel, may be performed in relation to the received Random Access preamble.

The radio connection establishment response in the step of transmitting the radio connection establishment response may comprise a scrambling code for Uplink, UL transmission by the UE.

The radio connection establishment response in the step of transmitting the radio connection establishment response, may comprise a scheduling grant for Uplink, UL transmission by the UE.

The method in a first Radio Base Station, RBS may further comprise receiving from the UE a scheduled signaling message (S-232) coded by a scrambling code known to the first RBS, wherein the radio connection request further comprises a global identity of the UE.

The radio connection establishment request may comprise a preamble.

The radio connection establishment request, may comprise a Random Access Radio Network Temporary Identifier, RA-RNTI.

The radio connection establishment responses in the step of receiving a radio connection establishment response, may each comprise an UL scheduling grant for UL transmission to the first and the second RBS, respectively.

The radio connection establishment responses in the step of receiving a radio connection establishment response, may each comprise a scrambling code for UL transmission to respective RBS.

The method in a User Equipment may comprise performing analysis of the measurement results, and wherein the step of selecting a RBS is performed based on the analysis of said measurement results.

The step of selecting a RBS may be based on analysis of power of the received radio connection establishment responses, and wherein the RBS related to the highest power is selected.

The step of selecting a RBS may be based on analysis of power of the received set of DL reference signals, and wherein the RBS related to the highest power is selected.

The step of selecting a RBS may be based on analysis of timing of the received radio connection establishment responses, and wherein selecting comprises selecting the RBS related from which the UE first received a radio connection establishment response.

The step of selecting a RBS may be based on analysis of timing of the received set of DL reference signals, and wherein selecting comprises selecting the RBS related from which the UE first received a set of DL reference signals.

The step of selecting a RBS may be based on analysis of historic information of prior RBS selections.

The step of selecting a RBS may be based on analysis of a priority level indicated in radio connection establishment response.

The method in a User Equipment may comprise transmitting scheduled signaling to the selected first RBS using the scrambling code as received in the step of receiving radio connection establishment responses A foundational property of the BCH area is the use of the same random access configuration is all nodes of the BCH area. This means that several nodes may participate in the random access reception. Naturally, all these nodes can respond to the random access. This invention resolves the contention situation that arises when several nodes respond to the random access, and makes a selection of a node or nodes that participate in the completion of the random access.

This means that both the benefits of joint initial random access reception in the BCH area uplink, and well as the benefits with spatial directivity gains and interference suppression in the BCH area downlink can be exploited.

BRIEF DESCRIPTION OF DRAWINGS

These and other aspects, features and advantages of which the invention is capable of, will be apparent and elucidated from the following description of embodiments of the present invention, reference being made to the accompanying drawings, in which.

ABBREVIATIONS

Figure 1:
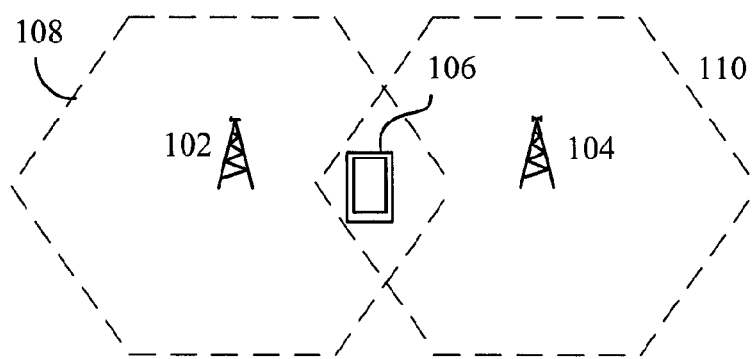
FIG. 1 illustrates a communication system, related to the present invention, FIG. 2 schematically illustrates a signaling flow chart according to some embodiments of the present invention, FIGS. 3 and 4 schematically illustrate flow-chart of method steps according to embodiments of the present invention, and FIGS. 5 and 6 schematically illustrate radio network nodes according to embodiments of the present invention.

3GPP 3rd Generation Partnership Project
BCH Broadcast Channel
CoMP Coordinated Multi-Point transmission and reception
eNB Evolved NodeB
Gbps Giga bit per second
GSM Global System for Mobile Communications
HSPA High Speed Packet Access
LTE Long Term Evolution
MBSFN Multicast Broadcast Single Frequency Network
OFDM Orthogonal Frequency Division Multiplexing
RA Random Access
RACH RA Channel
RBS Radio Base Station
UE User Equipment

DETAILED DESCRIPTION

The studied situation features a grouping of nodes into BCH areas, within which the nodes jointly broadcast selected information. One such piece of information is the random access configuration, indicating the available random access opportunities, as well as the random access preamble format configuration and transmission power settings.

Furthermore, the random access from the mobile is received jointly by the nodes in the BCH area. This means that either only one node may have received the random access or multiple nodes have received the random access, possibly via coordinated reception.

Since the random access is not cell specific in the described system, situations may arise where several base stations answer the initial random access message transmitted from the UE. This calls for contention resolution also on random access response.

The random access response resources used should preferably be locally unique and orthogonal. It is important that in case two network nodes answers a random access attempt from a User Equipment that they use physical transmission formats that are as different as possible. E.g. the demodulation reference signals may be different, the data may be scrambled differently, and the physical time and frequency resources used may be non-overlapping. To ensure this, traditional cell planning can be used, or alternatively automatic algorithms may be used e.g. similar to the automatic neighbor relation list (ANR) algorithms that distribute locally unique physical cell identities.

The random access response may have a random transmission timer. In case two random access responses collide and none of them are decodable by the UE then the UE will need to start with a new random access attempt. For the following attempts it is important that the same error is not repeated over an over again. This can be resolved by a random access response transmission timer.

In case multiple random access responses are possible, the UE may select a preferred random access response node. The selection may be based on;
  the received random access response power, where the mobile selects the node received at the highest power
  the received node reference signal power, where the mobile selects the node received at the highest power,
  the received random access response timing, where the mobile selects the node received first, possibly after adjusting the reception times based on known relative node timings,
  the received node reference signal timing, where the mobile selects the node received first, possibly after adjusting the reception times based on known relative node timings,
  historic information of prior node selections, or
  a priority level indicated in the random access response The basic concept of the invention thus relates to contention resolution of DL messaging for a User Equipment, (UE) receiving a radio connection establishment response from each one of at least two Radio Base Stations (RBS) in a communication system.

FIG. 1 schematically illustrates part of a communication system comprising a first Radio Base Station, RBS 102 and a second RBS 104. Within coverage areas 108 and 110 of the respective RBS, a UE 106 is located.

Figure 2:
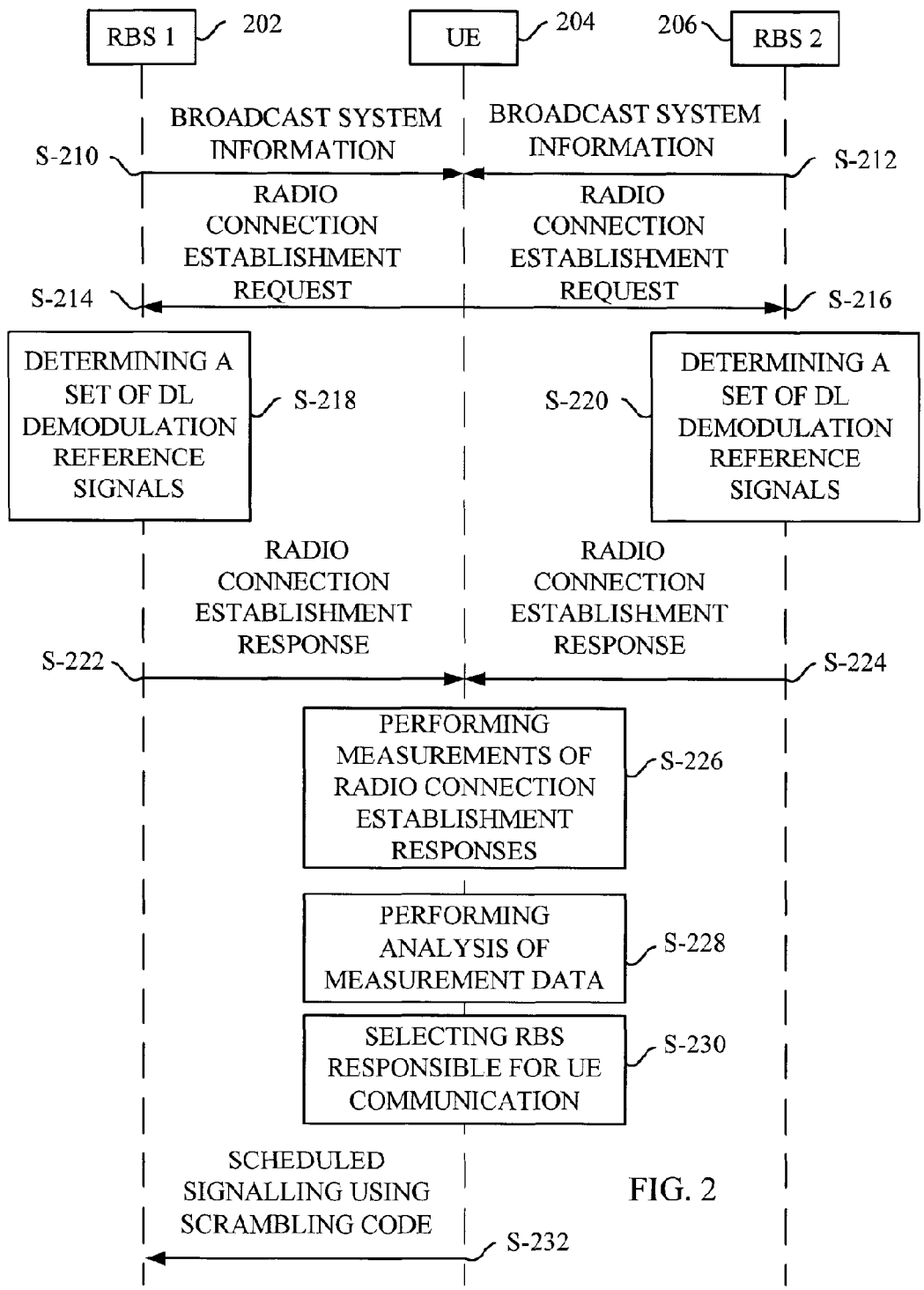

With reference to FIG. 2, illustrating a schematic signalling diagram, some embodiments of the present invention will be described.

Within a coverage area of at least a first RBS, 202 and a second RBS 206, system information using a Broadcast Channel using Multimedia Broadcast Single Frequency Network (MBSFN) format is transmitted to at least one UE 204, in steps S-210 and S-212, respectively. The system information is related to establishing a radio connection to the UE of a plurality of UEs. Further, broadcasting by the first RBS 202 and the second RBS 204 is performed synchronously in time on the Broadcast Channel (BCH) using a MBSFN radio transmission format.

The broadcasted system information may comprise Random Access Channel (RACH) information, and may comprise physical configuration information of the Random Access Channel. Examples of the physical configuration are available preambles, information where the Random Access (RA) time slots for Uplink (UL) RA transmission are located and which frequency bands can be used for initial transmission by a UE.

It should be mentioned that the system information that is broadcasted by the first RBS 202 is the same system information that is broadcasted by the second RBS 206. The same physical resources are used. They system information is further broadcast using a long cyclic prefix, such that the received system information as sensed by a UE benefits from constructive interference of signal components of the same information from separate RBSs.

At the time the UE 204 out of the plurality of UEs wishes to establish a radio connection, the UE transmits a radio connection establishment request in steps S-214, S-216 to the first and second RBS, 202, 206, respectively. The radio connection establishment request may comprise a preamble, which can be arbitrarily chosen out of the available preambles, is received in steps S-210, 212.

The UE 204 is one representation of a plurality of UEs, for which reason the RBS 202 and RBS 206 may however receive multiple preambles from separate UEs.

The radio connection establishment request as transmitted by the UE in steps S-214, S-216, may comprise information in relation to the broadcast system information that the UE 204 receives in steps S210, S-212. Said information as comprised in the radio connection establishment request information, may comprise one or more identity indicators associated with one or more RBSs. An identity indicator can for instance be associated with a DL demodulation reference signal. By including such an identity indicator in the radio connection establishment request, the UE can inform RBSs about its preferred DL demodulation reference signal which. The determination of the set of DL demodulation reference signals, as performed in steps s-218, S-220 may therefore be based on a preference as communicated by the UE.

Noteworthy, the RBS can take into account information regarding preferred DL demodulation reference signal. The RBS may alternatively however totally ignore it or take it into account partly.

Accordingly, based on the received radio connection establishment request, the first RBS 202 thus determines a set of DL demodulation reference signals associated with a DL control channel, in steps S-218, S-220.

Having determined the set of DL demodulation reference signals associated with a DL control channel in step S-218, S-220, a radio connection establishment response is then transmitted by each one of the first and the second RBS, in steps S-222, S-224.

One of the first and the second RBSs may subsequently receive a scheduled signalling message in step S-232 from the UE 204, confirming selection of the RBS of receipt as the RBS responsible for the communication with the UE. The UE uses a RBS specific scrambling code that was communicated to the UE in the steps of transmitting the radio connection establishment response by each RBS in steps S-222, S-224. By transmitting using a scrambling code known to the only one of the two RBSs, only one RBS can satisfactorily decode the scheduled message, being a proof of the correct addressee.

Figure 3:
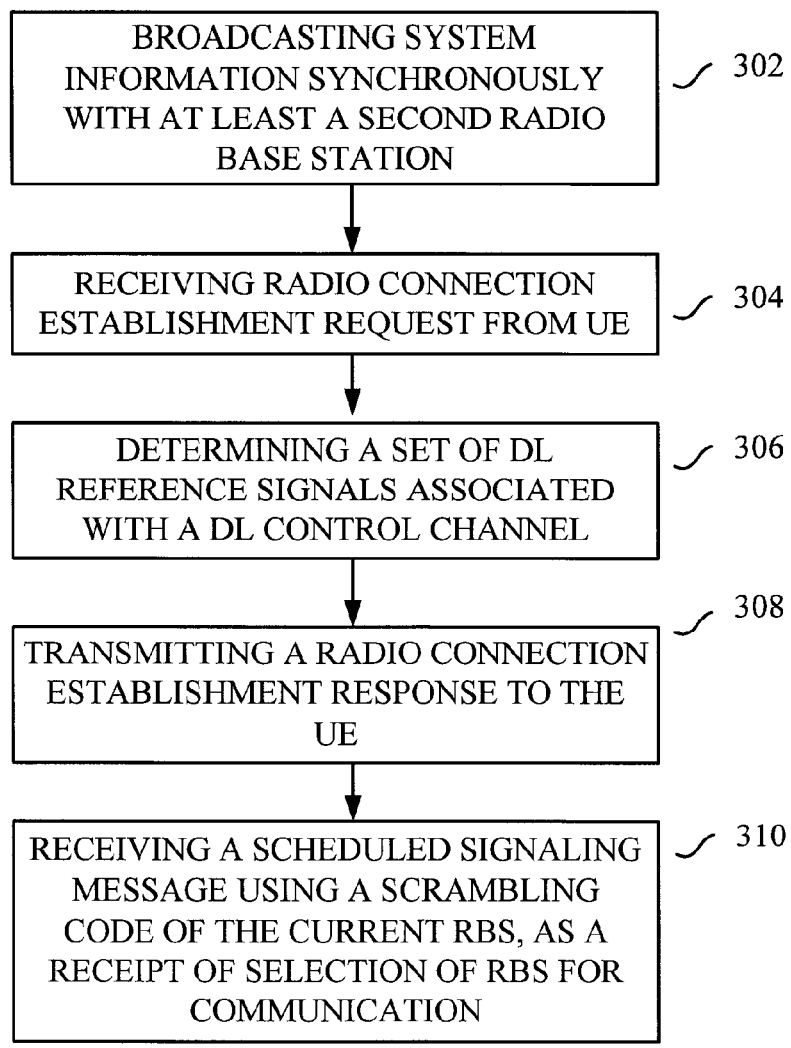

A method in a RBS 202, 206 for communicating radio connection establishment information using Orthogonal Frequency Division Multiplexing (OFDM) to a plurality of UEs 204 will now be described with reference to FIG. 3. The method comprises a step of broadcasting system information that is related to establishing a radio connection on a BCH using a MBSFN radio transmission format, to said plurality of UEs. The broadcasting is performed synchronously in time with broadcasting the same system information on BCH using MBSFN radio transmission format by at least a second RBS, as illustrated in step 302. The RBS then receives a radio connection establishment request from the UE, in step 304, wherein the radio connection establishment request is related to the broadcasted system information. The method in the RBS subsequently determines a set of DL demodulation reference signals that are associated with a DL control channel, based on the radio connection establishment request. This is illustrated in step 306. The method in the RBS also comprises transmitting to the UE a radio connection establishment response comprising the set of DL demodulation reference signals associated with a control channel, as illustrated in step 308.

In addition, the method may comprise receiving a scheduled signaling message using the scrambling code of the current RBS in step S-310, as a receipt of selection of RBS for communication. Since separate RBSs will have separate scrambling codes, the RBS able to decode the message will be the correct decoder and therefore also correct addressee.

Figure 4:
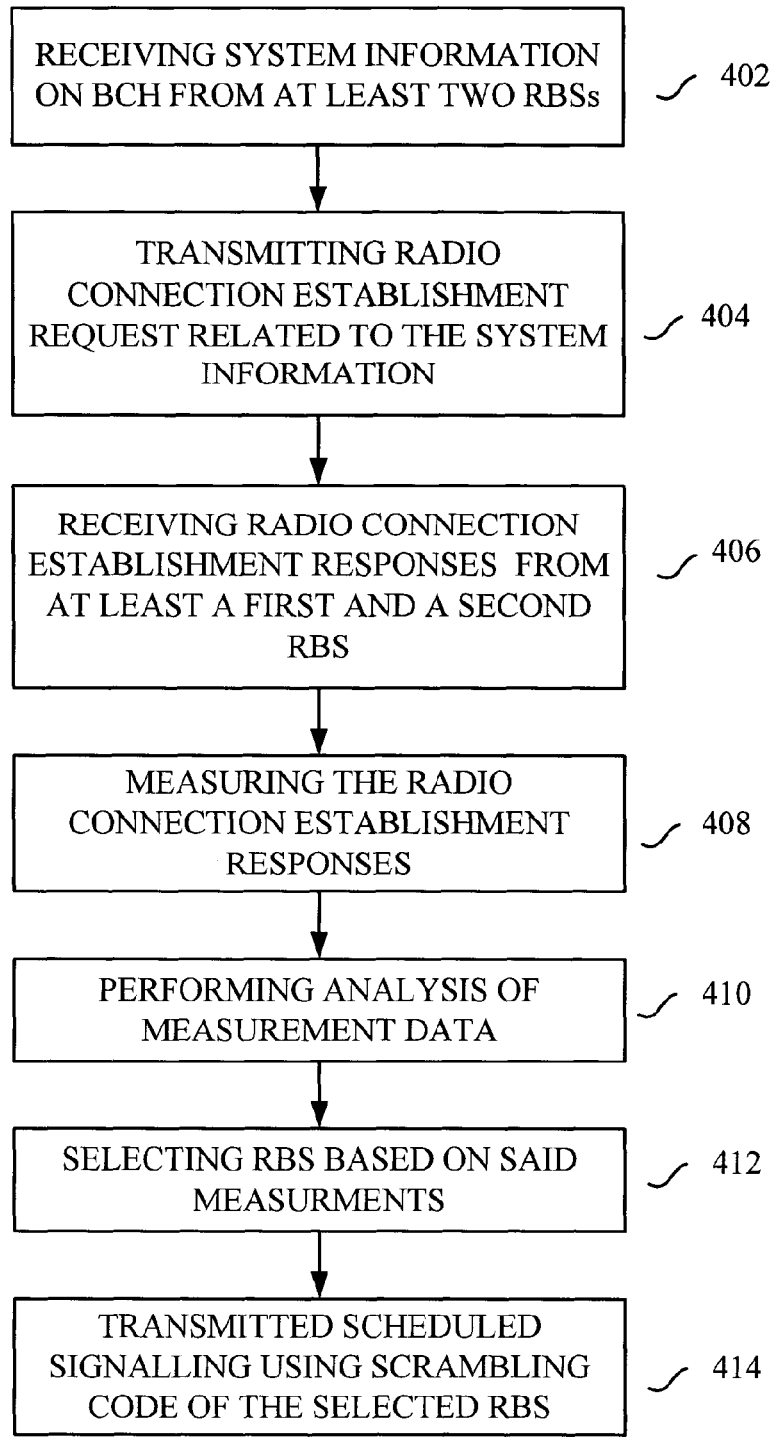

A method in a UE 204 for contention resolution of radio connection establishment responses from a plurality of RBSs 202, 206, will now be described with reference to FIG. 4. The method in the UE 204 comprises receiving broadcast system information on a Broadcast Channel, BCH from the plurality of RBSs 202, 206, as indicated in step 402 in FIG. 4. The UE 204 now transmits a radio connection establishment request, in step 404, to the plurality of RBSs 202, 206, in relation to the received broadcasted system information. The method further comprises receiving a radio connection establishment response from each of at least a first 202 and a second RBS 206, as illustrated in step 406, each of said radio connection establishment response comprising a set of DL demodulation reference signals associated with a control channel. Then, the method comprises performing measurements of the received radio connection establishment responses, as illustrated in step 408, thereby obtaining measurement results. Based on the obtained measurement results, the method then comprises selecting the first RBS 202 to be responsible for communication with the UE, as illustrated in step 412.

In addition, the method may further comprise performing analysis of the obtained measurement results, as illustrated in step 410, wherein the step of selecting a RBS, step 412, is performed based on the analysis of said performed measurements.

In addition, the method may further comprise transmitting a scheduled signaling message using a scrambling code of the selected RBS, as illustrated in step 414.

Figures 5, 6:
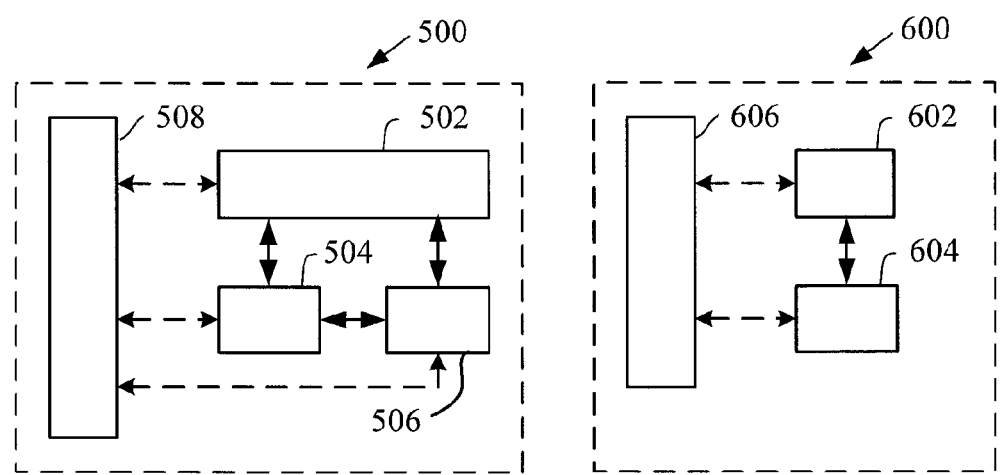

With reference to FIG. 5, schematically illustrating a RBS, some possible types of architecture will be disclosed. A Radio Base Station, RBS (202, 206, 500) for communicating radio connection establishment information using Orthogonal Frequency Division Multiplexing, OFDM to a plurality of User Equipments, UEs, comprises a transceiver 502, a scheduler 504, a processor 506 as well as controlling means 508, such as a control unit, for controlling the method steps of the RBS when performing the method in the RBS according to the present invention.

The transceiver 502 is configured to be connected to the scheduler 504, the processor 506 as well as to the controlling means 508. The transceiver is configured to broadcast system information related to establishing a radio connection on a Broadcast Channel, BCH S-210, S-212, 302 using a Multicast Broadcast Single Frequency Network, MBSFN radio transmission format to said plurality of User Equipments, UEs 204, 600. The transceiver is configured to receive a radio connection establishment request S-214, S-216, 304 from a UE 204, 600 related to the broadcasted system information. The scheduler 504 is configured to schedule the transceiver to broadcast the system information synchronously in time with at least another RBS broadcasting the same system information on BCH using MBSFN radio transmission format. The processor 506 of the RBS is configured to be connected to the scheduler and to determine a set of Downlink, DL demodulation reference signals associated with a DL control channel, based on the received radio connection establishment request. The transceiver 502 is further configured to transmit to the UE 204, 600 a radio connection establishment response comprising the set of DL demodulation reference signals associated with a control channel S-222, S-224, 308.

With reference to FIG. 6, schematically illustrating a UE, some possible types of architecture are disclosed.

A UE 202, 206, 600 for communicating radio connection establishment information using Orthogonal Frequency Division Multiplexing, OFDM to a plurality of UEs, the RBS comprises a transceiver 602, a processor 604 as well as controlling means 606, such as a control unit, for controlling the method steps of the UE when performing the method in the UE according to the present invention.

The transceiver 602 is configured to be connected to the processor 604 as well as to the controlling means 606. The transceiver 602 is further configured to receive broadcast system information on a Broadcast Channel, BCH in dedicated sub-frames S-210, S-212, 402 from the plurality of RBSs 102, 104, 202, 206, 500, to transmit a radio connection establishment request S-214, S-216, 404 to a number of RBSs, based on the received broadcast system information, and to receive radio connection establishment responses S-222, S-224, 406 from a from each of at least a first RBS 202 and a second RBS 206 RBS, wherein the radio connection establishment response each comprises a set of Downlink, DL demodulation reference signals associated with a DL control channel.

The processor 604 is configured to be connected to the transceiver 602, and to perform measurements 408 of the received radio connection establishment responses, thereby obtaining measurement results, and configured to select 412, S-230 the first RBS 202 to be responsible for communication with the UE based on the obtained measurement results.

The selection can be based on
the received random access response power, where the mobile selects the node received at the highest power,
the received node reference signal power, where the mobile selects the node received at the highest power,
the received random access response timing, where the mobile selects the node received first, possibly after adjusting the reception times based on known relative node timings,
the received node reference signal timing, where the mobile selects the node received first, possibly after adjusting the reception times based on known relative node timings,
historic information of prior node selections, or
a priority level indicated in the random access response The embodiments of the present invention have the following advantages.

A foundational property of the Broadcast Area is the transmission of the same random access configuration, as broadcast in the system information, by all active RBS of the BCH area. This means that several RBSs may receive a radio connection establishment request. Naturally, all these RBSs can respond to the said radio connection establishment request, which may be a random access request.

The embodiments of the present invention resolve the contention situation that arises when several RBSs respond to the radio connection establishment request, and performs a selection of one RBS or possibly more, to communicate with the UE.

This means that the benefit of joint initial random access reception in the Broadcast Channel Area Uplink, as well as the benefit with spatial directivity gains and destructive interference suppression in the Broadcast Channel Area Downlink can be exploited.

It must be emphasized that the present invention can be varied in many ways. The elements of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims.

The invention claimed is:

1. A method, in a first Radio Base Station (RBS), for communicating radio connection establishment information using Orthogonal Frequency Division Multiplexing (OFDM) to a plurality of User Equipment (UEs), the method comprising:
broadcasting, on a Broadcast Channel (BCH) using a Multicast Broadcast Single Frequency Network (MBSFN) radio transmission format to the plurality of UEs, system information related to establishing a radio connection, wherein the broadcasting is performed synchronously in time with broadcasting the same system information on BCH using MBSFN radio transmission format by at least a second RBS;
receiving a radio connection establishment request from a first UE of the plurality of UEs, wherein the radio connection establishment request is related to the broadcasted system information;
determining, based on the radio connection establishment request, a set of Downlink (DL) demodulation reference signals associated with a DL control channel; and
transmitting a radio connection establishment response to the first UE, the response comprising the set of DL demodulation reference signals associated with a control channel.

2. The method of claim 1, wherein the system information comprises Random Access Channel (RACH) information.

3. The method of claim 1, wherein the radio connection establishment request comprises a Random Access preamble related to the broadcasted system information.

4. The method of claim 3, wherein the determining the set of DL demodulation reference signals is performed in relation to the received Random Access preamble.

5. The method of claim 1, wherein the radio connection establishment request comprises a Random Access Radio Network Temporary Identifier (RA-RNTI) related to the broadcasted system information.

6. The method of claim 1, wherein the radio connection establishment response comprises a scrambling code for Uplink (UL) transmission by the first UE.

7. The method of claim 1, wherein the radio connection establishment response comprises a scheduling grant for Uplink (UL) transmission by the first UE.

8. The method of claim 1:
further comprising receiving, from the first UE, a scheduled signaling message coded by a scrambling code known to the first RBS; and
wherein the radio connection request comprises a global identity of the first UE.

9. A method, in a User Equipment (UE), for contention resolution of radio connection establishment responses from a plurality of Radio Base Stations (RBSs), the method comprising:
receiving broadcast system information on a Broadcast Channel (BCH) from each of the plurality of RBSs, wherein the received system information comprises identical system information having been synchronously transmitted on the BCH by each of the plurality of RBSs;
transmitting a radio connection establishment request to the plurality of RBSs, the radio connection establishment request related to the received broadcasted system information;
receiving a radio connection establishment response from each of at least two RBSs, each radio connection establishment response comprising a set of Downlink (DL) demodulation reference signals associated with a corresponding DL control channel;
performing measurements of the received radio connection establishment responses to obtain measurement results; and
selecting a first RBS responsible for communication with the UE based on the measurement results.

10. The method of claim 9, wherein the radio connection establishment request comprises a preamble.

11. The method of claim 9, wherein the radio connection establishment request comprises a Random Access Radio Network Temporary Identifier (RA-RNTI).

12. The method of claim 9, wherein the radio connection establishment responses each comprise an Uplink (UL) scheduling grant for UL transmission to at least two of the RBSs.

13. The method of claim 9, wherein the radio connection establishment responses each comprise a scrambling code for Uplink (UL) transmission to respective RBS.

14. The method of claim 9:
further comprising performing an analysis of the measurement results; and
wherein the selecting the first RBS is performed based on the analysis of the measurement results.

15. The method of claim 14:
wherein the selecting the first RBS is based on an analysis of power of the received radio connection establishment responses; and
wherein the RBS corresponding to the highest power is selected.

16. The method of claim 14:
wherein the selecting the first RBS is based on an analysis of power of the received set of DL reference signals; and
wherein the RBS corresponding to the highest power is selected.

17. The method of claim 14:
wherein the selecting the first RBS is based on an analysis of timing of the received radio connection establishment responses; and
wherein the selecting comprises selecting the RBS from which the UE first received a radio connection establishment response.

18. The method of claim 14:
wherein the selecting the first RBS is based on an analysis of timing of the received set of DL reference signals; and
wherein selecting comprises selecting the RBS from which the UE first received a set of DL reference signals.

19. The method of claim 14, wherein the selecting the first RBS is based on an analysis of historic information of prior RBS selections.

20. The method of claim 14, wherein the selecting the first RBS is based on an analysis of a priority level indicated in radio connection establishment response.

21. The method of claim 9:
wherein the radio connection establishment responses each comprise a scrambling code for Uplink (UL) transmission to respective RBS; and
further comprising transmitting scheduled signaling to the selected first RBS using the scrambling code in the corresponding radio connection establishment response.

22. A Radio Base Station (RBS) for communicating radio connection establishment information using Orthogonal Frequency Division Multiplexing (OFDM) to a plurality of User Equipment (UEs), the RBS comprising:
a transceiver configured to:
broadcast, on a Broadcast Channel (BCH) using a Multicast Broadcast Single Frequency Network (MBSFN) radio transmission format to the plurality of UEs, system information related to establishing a radio connection; and
receive a radio connection establishment request from a UE related to the broadcasted system information;
a scheduler operatively connected to the transceiver and configured to schedule the transceiver to broadcast the system information synchronously in time with at least another RBS broadcasting the same system information on BCH using MBSFN radio transmission format;
a processor operatively connected to the scheduler and to the transceiver, the processor configured to determine, based on the received radio connection establishment request, a set of Downlink (DL) demodulation reference signals associated with a DL control channel; and
wherein the transceiver further is configured to transmit, to the UE, a radio connection establishment response comprising the set of DL demodulation reference signals.

23. A User Equipment (UE) for contention resolution of radio connection establishment responses from a plurality of Radio Base Stations (RBSs), the UE comprising:
a transceiver configured to:
receive broadcast system information on a Broadcast Channel (BCH) in dedicated sub-frames from each of the plurality of RBSs, wherein the received system information comprises the identical system information having been synchronously transmitted on the BCH by each of the plurality of RBSs;
transmit a radio connection establishment request to a number of RBSs based on the received broadcast system information; and
receive radio connection establishment responses from each of at least two RBSs, wherein the radio connection establishment responses each comprise a set of Downlink (DL) demodulation reference signals associated with a corresponding DL control channel; and
a processor connected to the transceiver and configured to:
obtain measurement results by performing measurements of the received radio connection establishment responses; and
select a first RBS to be responsible for communication with the UE based on the obtained measurement results.

* * * * *